United States Patent [19]

Carcia et al.

[11] Patent Number: 4,857,373
[45] Date of Patent: Aug. 15, 1989

[54] OPTICAL RECORDING ELEMENT

[75] Inventors: Peter F. Carcia; Franklin D. Kalk, both of Wilmington, Del.

[73] Assignee: E. I. Du Pont de Nemours and Company, Wilmington, Del.

[21] Appl. No.: 32,376

[22] Filed: Mar. 31, 1987

[51] Int. Cl.⁴ .......................... G11B 5/84; B32B 3/02
[52] U.S. Cl. .......................................... 428/64; 428/65; 428/76; 428/688; 428/689; 428/697; 428/913; 428/422; 428/333; 427/41; 346/76 L; 346/135.1; 430/945; 369/288
[58] Field of Search ................ 428/65, 688, 689, 697, 428/64, 76, 913, 220, 337, 422, 333; 430/945; 346/135.1, 76 L; 369/288; 427/41

[56] References Cited

U.S. PATENT DOCUMENTS

| | | | |
|---|---|---|---|
| 4,000,334 | 12/1976 | Hallman et al. | 430/945 |
| 4,659,588 | 4/1989 | Yamada et al. | 427/162 |
| 4,673,626 | 6/1987 | Takeda et al. | 428/201 |

FOREIGN PATENT DOCUMENTS

| | | |
|---|---|---|
| 0208290 | 10/1985 | Japan . |
| 1037490 | 2/1986 | Japan . |
| 61-247 | 3/1986 | Japan . |
| 8600744 | 1/1986 | World Int. Prop. O. . |

Primary Examiner—Ellis P. Robinson
Assistant Examiner—P. J. Ryan

[57] ABSTRACT

A nonablative optical recording element comprising a light-absorptive layer supported upon a dimensionally stable substrate in which the light-absorptive layer is a continuous, morphologically stable, amorphous, thin layer of an eutectic alloy of Te with at least one thermally conductive metal.

12 Claims, 5 Drawing Sheets

MONOLAYER OPTICAL DISK

MONOLAYER OPTICAL DISK

DUAL MONOLAYER OPTICAL DISK

TRILAYER OPTICAL DISK

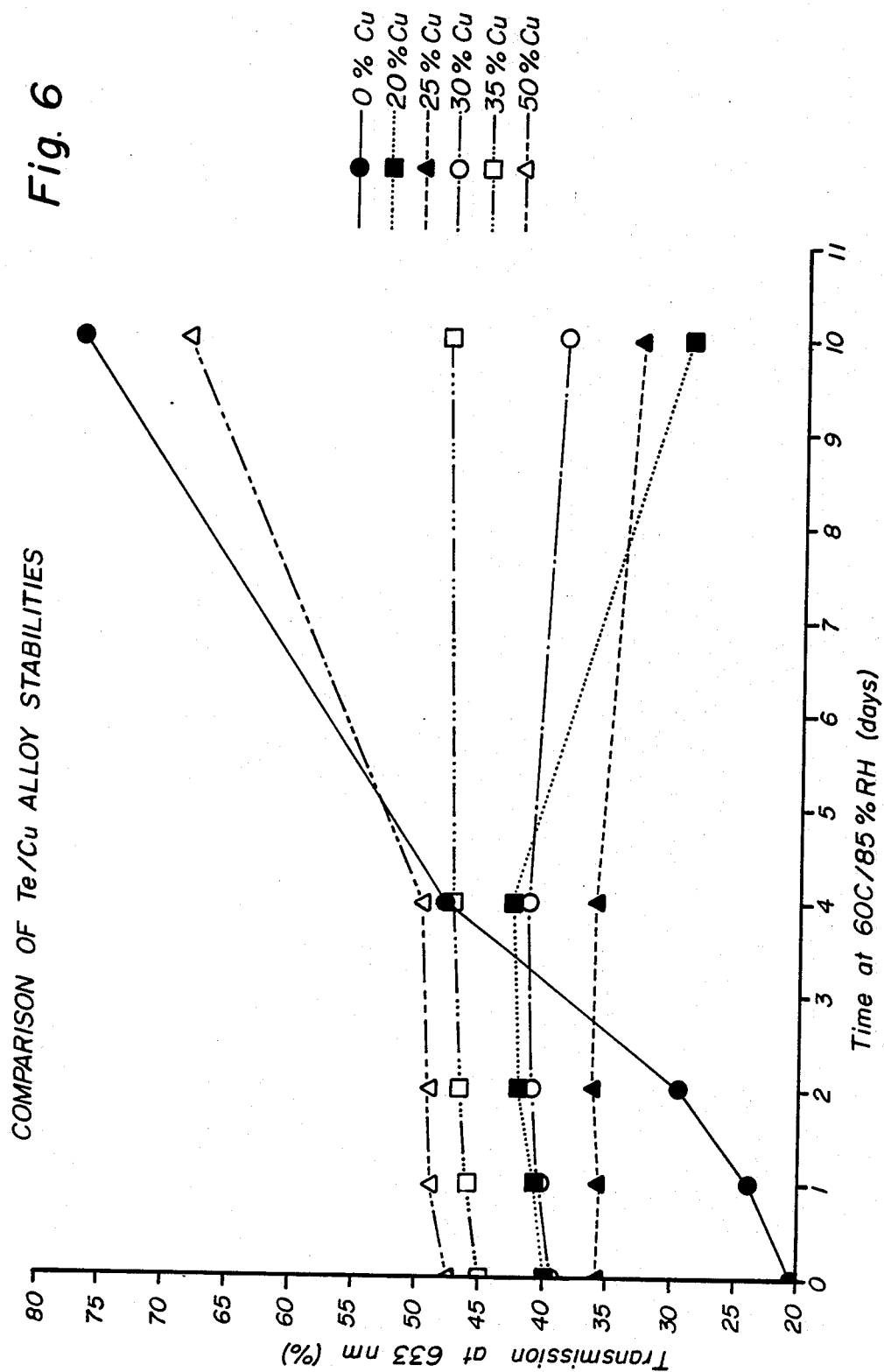

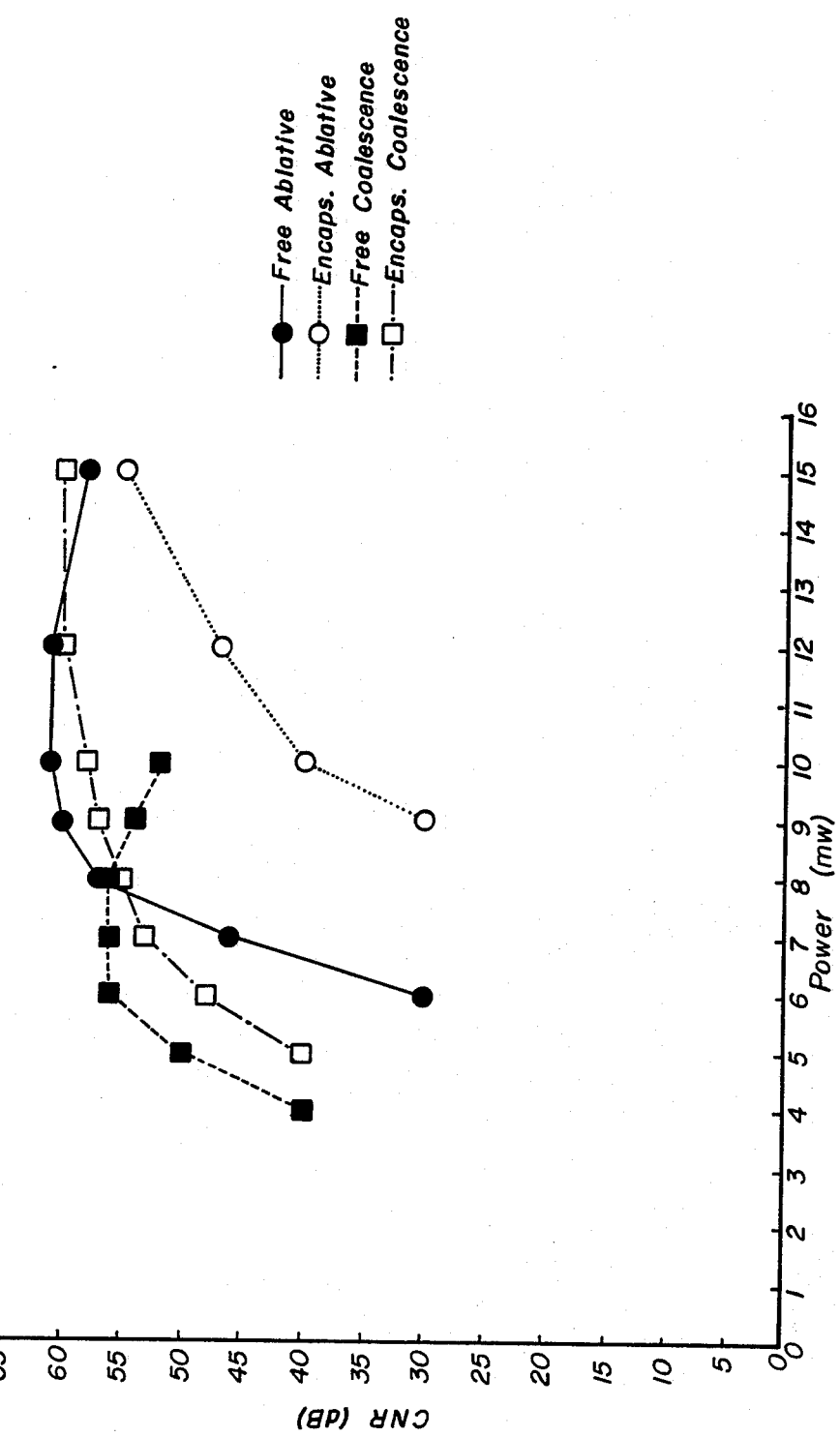

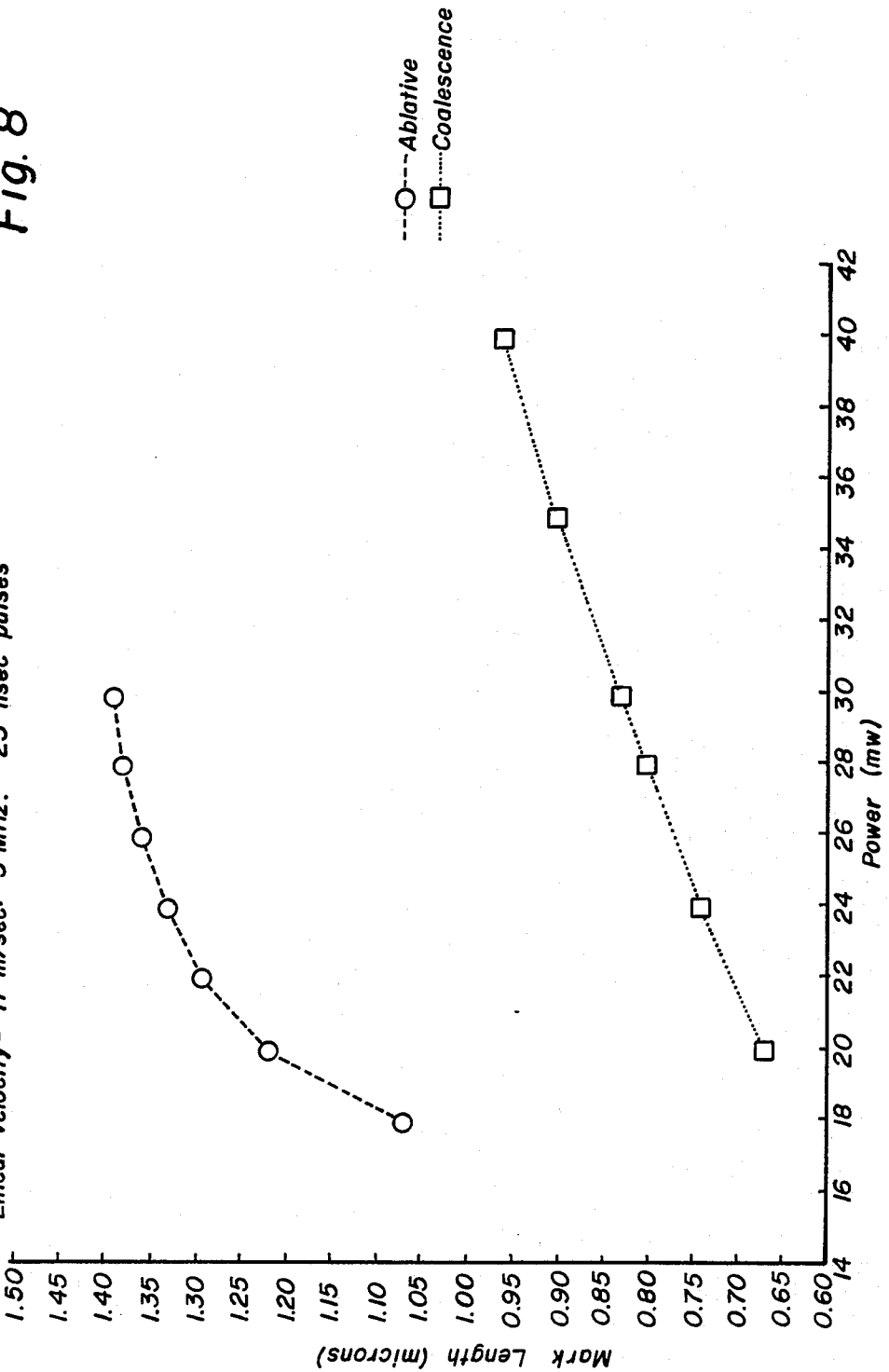

OPTICAL RECORDING ELEMENT

FIELD OF INVENTION

The invention is directed to an optical recording element and, in particular, to such recording elements in which both the recording and playback of data utilize laser beams.

BACKGROUND OF THE INVENTION

In response to the demand for more reliable and higher capacity data storage and retrieval systems, there is considerable activity in the research and development of so-called optical disk recording systems. These systems utilize a highly focused modulated beam of light, such as a laser beam, which is directed onto a recording layer which is capable of absorbing a substantial amount of the light. The heat thusly produced causes the light-absorbing material in the areas struck by the highly focused laser beam to change chemically and/or physically, thus producing a concomitant change in optical properties, e.g., transmissivity or reflectivity, in the affected area. For readout, the contrast between the amount of light transmitted or reflected from the unaffected parts of the absorbing layer and from the marked areas of the layer is measured. Examples of such recording systems are disclosed in U.S. patents throughout the literature and in numerous U.S. patents such as U.S. Pat. Nos. 3,314,073 and 3,474,457. In recording data, a rotating disk having a light-absorptive recording layer is exposed to modulated radiation from a laser source. This radiation is passed through a modulator and appropriate optics, and the highly focused laser beam is directed onto the disk which forms by chemical and/or physical reaction of the light-absorbing layer a series of very small marks along a circular path within the light-absorptive layer. The frequency of the marks is determined by the modulator inputs. Using laser beams with a focused spot diameter of 1 micron or less, data can be stored at a density of $10^8$ bits/cm$^2$ or higher.

The simplest optical disk medium consists merely of a dimensionally stable solid substrate on which is coated a thin layer of light-absorptive material such as a metal layer. When the light-absorptive layer is struck by an intense beam of coherent light, such as from a laser source, the light-absorptive material is either vaporized and/or thermally degraded, thereby producing a very small marked area which exhibits different transmissivity or reflectivity than the adjacent unmarked layer. A more advanced laser recording medium is disclosed in Nam, U.S. Pat. No. 4,410,581 in which a single recording layer is completely encapsulated between an intermediate layer of solvent-resistant plastic material formed on a transparent substrate and a protective solvent-based plastic layer formed on the recording layer. In this instance, the encapsulated recording layer is imaged by a laser beam passing through the transparent substrate to burn a very small hole in the layer.

Multilayer antireflection structures, such as those disclosed in U.S. Pat. No. 4,305,081 to Spong and U.S. Pat. No. 4,270,132 to Bell, increase the absorption of the laser beam which also gives better read/write contrast than with the use of simple single layer media. Therefore, for purposes of obtaining better power efficiency, sensitivity and permanency of the record, it has been preferred to use multilayer antireflective structures.

There are two basic types of multilayer antireflective structures, one of which is basically a bilayer structure and the other a trilayer structure. In bilayer media, the substrate is coated with a very smooth, highly reflective material such as aluminum, on top of which is coated a layer of moderately light-absorptive material which is preferably of a thickness corresponding to about $\gamma/4n$, where is the wavelength of the recording light source and n is the refractive index of the light-absorptive layer. In trilayer media, the substrate is likewise coated with a first layer of very smooth highly reflective material on which is coated a second layer of transparent material. Atop the transparent second layer is coated a thin third layer of strongly light-absorptive material. The combined thickness of the transparent and absorptive layers is preferably adjusted to be about $\gamma/4n$. In both types of structures, the adjustment of certain layer thicknesses according to the wavelength of light and refractive index of the layer is for the purpose of minimizing the amount of light reflected from the unmarked areas and maximizing the amount of light reflected from the marked areas, thus producing a higher playback signal amplitude. A detailed discussion of the three types of disk construction is given by A. E. Bell in Computer Design, January 1983, pp. 133-146 and the references cited therein. See especially Bell and Spong, IEEE Journal of Quantum Electronics, Vol. QE-14, 1978, pp. 487-495.

It will be realized, of course, that the terms "bilayer" and "trilayer" refer only to the fundamental optical layers and do not exclude the use of ancillary layers. For example, a very thin layer of polymeric material may be interposed between the substrate and the reflective layer in order to compensate for insufficient smoothness of the substrate or to improve adhesion of the reflective layer. Also, one or more transparent layers may be coated over the light-absorptive layer to protect the fundamental layers from adverse atmospheric conditions or to insulate thermally the other layers. Also, quite frequently the light-absorptive layer will be coated with a relatively thick layer of transparent material which serves as a defocusing layer which prevents surface dust and contaminants from interfering with the optical properties of the entire medium.

While mark formation in such structures identified above frequently involves physical removal of material by ablation or some other means to form a pit or hole in the media, a dispersion imaging system such as disclosed in Hallman et al., U.S. Pat. No. 4,000,334 may also be used. In this instance, laser energy incident on a thin continuous absorptive layer, forms a transparent discontinuous area of dispersed small globules.

The desired properties of optical recording media are (1) high sensitivity, (2) high signal-to-noise ratio (SNR), (3) high tolerance to material variation, contaminants and other defects, and (4) high archival stability after extended storage and/or recording and readout (see Bartolini, J. Vac. Sci. Technology Vol. 18, No. 1, January/February 1981, p. 70). Based upon these criteria, a considerable amount of research has been and continues to obtaining the best to be carried out directed possible disk materials. In particular, a majority of the work done up to this time on materials for the light-absorptive or recording layer has been directed to thin films of metals and chalcogenides such as tellurium and tellurium alloys, rhodium, bismuth, indium, lead, aluminum, platinum, nickel, titanium and silver. Of these, by far the greatest amount of work has been directed to the use of tellurium and its alloys with such elements as arsenic, antimony, selenium, germanium, phosphorus, silicon, thalium, indium, tin, copper, silver, iron, bismuth, aluminum, zinc and vanadium. While much effort has been spent in developing ternary and quaternary systems involving chalcogenides with metals, much less effort has been directed to binary systems such as tellurium/copper. Such a system has been disclosed in Japanese Patent Publication No. 60-208290 for use with laser radiation a 650 nm wavelength or longer. Inorganic oxides such as lead oxide, tungsten oxide, titanium oxide, silicon oxide, zirconium oxide and the like have also been investigated and found to be suitable to some extent as the recording medium for optical disks.

Many of the above metals, chalcogenides and their alloys form oxidatively stable films at thicknesses of several hundred angstroms or higher. However, when they are used as ultra-thin layers, e.g., below 150 A, as frequently required, the chalcogenides and their alloys are usually oxidatively unstable. Furthermore, chalcogenides and their alloys, especially Te and its alloys, frequently undergo extensive morphological changes with changes in temperature. While this change in morphology may be useful in some instances, more frequently it introduces undesirable element of instability.

SUMMARY OF THE INVENTION

In its primary aspect, the invention is directed to a non-ablative optical recording element comprising a light-absorptive layer supported upon a dimensionally stable substrate in which the light-absorptive layer is a continuous morphologically stable amorphous layer of an eutectic alloy of Te with at least one thermally conductive metal and has a layer thickness of 40 to 150 A.

PRIOR ART

U.S. Pat. No. 4,000,334, Hallman et al.

The Hallman patent is directed to optical media in which marks are formed in the light-absorptive layer non-ablatively by a dispersion imaging mechanism. Absorptive layer thicknesses of 1,000 to 50,000 A are disclosed generally. In particular, a light-absorptive layer containing 95% Te and 5% Cu is disclosed, which has been found to be both oxidatively and morphologically unstable.

Japanese Patent Application No. 60-208290, Takita et al.

The Takita et al. application is directed to optical recording media in which the marks are formed in very thick, light-absorptive layers ablatively. The absorptive layer is comprised of a Te alloy containing 5–40% Cu (preferably 10–25% Cu) and optionally 1–50% Pb, per Cu, and is disclosed to have a thickness of at least 50 microns (500,000 A). Alloys of Te and Cu having an eutectic melting point are disclosed.

BRIEF DESCRIPTION OF THE DRAWINGS

The drawings consist of eight figures which may be characterized as follows:

FIG. 6 is a graphical correlation of the optical stability of Te/Cu alloy optical layers with time.

FIG. 7 is a graphical correlation of the respective power requirements for making ablative and non-ablative laser marks as a function of signal-to-noise ratio.

FIG. 8 is a graphical correlation of the respective power requirements for making ablative and non-ablative laser marks as a function of mark length.

DEFINITIONS

As used herein, the term "eutectic alloy" means solid alloy compositions having eutectic melting points and near-eutectic alloy compositions deviating by no more than 6%, atomic basis, from such true eutectic compositions.

As used herein, the term "alloy" refers to a substitutional solid solution in which atoms of the solid metal becomes part of the space lattice of the solute metal, i.e., they take the place of some of the solvent atoms at lattice sites.

The upper case letter "A" is used as an abbreviation for angstroms.

DETAILED DESCRIPTION OF THE INVENTION

A. Light-Absorptive Layer

The invention is based on the unexpected finding that when eutectic alloys of Te and a thermally conductive metal are used in very thin layers as the light-absorptive layer of monolayer and trilayer optical disk configurations, the disks made therefrom have several advantages over the prior art:

(1) the Te/Cu alloy in the compositional and thickness ranges of the invention is unusually stable both morphologically and oxidatively.

(2) the disks are more sensitive to laser light. Consequently, less laser power is required to give a useful mark;

(3) more data can be recorded in a given space; and (4) the layer is less sensitive to variations in laser output.

However, it must be noted that these advantages are obtained only when stable alloys are used and when the mechanism of mark formation is non-ablative, i.e., when the mark is formed by coalescence of the active layer material rather than by removal of the active material.

Figure 1B:
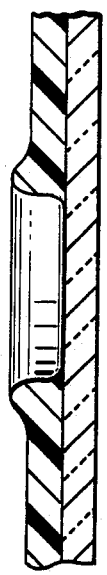
FIG. 1a is a magnified orthographic view of a laser mark formed ablatively and FIG. 1b is a cross-sectional view of an ablatively formed laser mark.
Figure 2B:
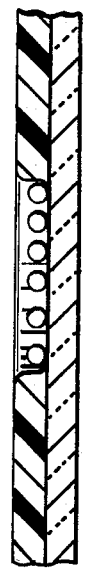
FIG. 2a is a magnified orthographic view of a laser mark formed non-ablatively and FIG. 2b is a cross-sectional view of a laser mark formed non-ablatively.
Figure 1A:
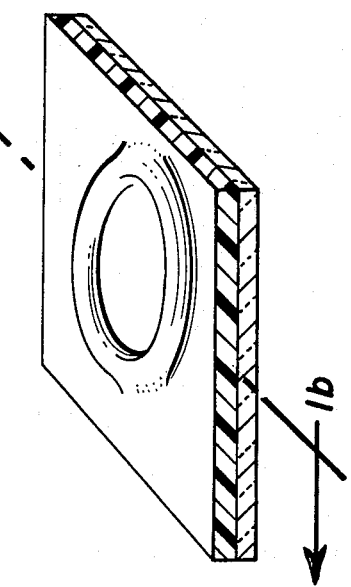
Figure 2A:
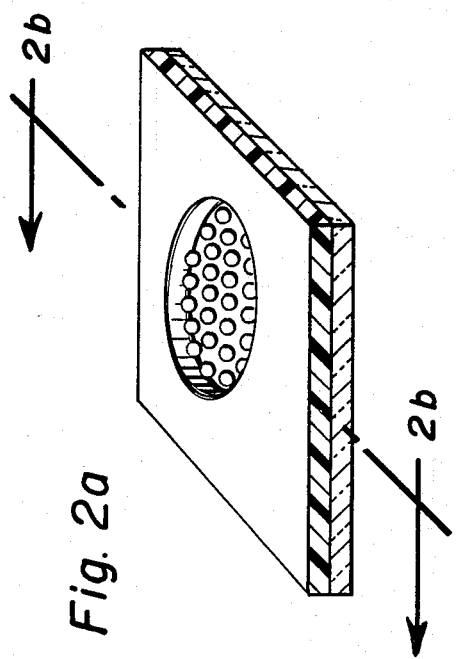

The important differences between ablative and coalescent mark formation can be seen by reference to FIGS. 1 and 2, which are representations of ablative and non-ablative mark formation, respectively. In ablative mark formation, the mark is characterized by complete displacement of the active layer material to the edges of the mark with the concomitant formation of a circumferential ridge. Thus, the ablative mark is in the form of a pit and is shaped similarly to a crater. On the other hand, the non-ablative mark is characterized by the coalescence of numerous clusters of active layer material which are dispersed throughout the mark area without any formation of a lip at the outer edges of the mark. This latter type of mark formation has been found to be much more effective in use and has the quite unexpected advantage that it is even more effective when it is encapsulated. On the other hand, the encapsulation of ablative active layers resulted in less effective readout properties.

In order to ensure that the optical media of the invention function non-ablatively, it is necessary that the light-absorptive layer of the optical medium of the invention have a thickness of no more than 150 A. At higher thicknesses, the mechanism of mark formation becomes ablative when sufficient power is used to make an effective mark. Furthermore, the light-absorptive layer must be no thinner than 40 A lest it become too transparent and thus insufficiently light-absorptive for effective readout.

It should be noted that the coalescent mechanism of mark formation which characterizes the optical media of this invention does not involve any significant change in the crystalline state of the light-absorptive alloy. The eutectic alloy is also quite oxidatively stable in thin films within the range of this invention. It is quite surprising that such thin films in the 40–150 A range have both oxidative and morphological stability. In addition, such thin eutectic films record laser marks extremely well in the encapsulated embodiments of the invention describe herein.

B. Optical Disk Configuration

The optical recording elements of the invention can be of either monolayer or trilayer optical configuration Thus these elements vary widely in the number and character of the functional layers which constitute each type of disk. This can be readily observed by reference to FIGS. 3, 4 and 5 of the drawings.

Figure 3:
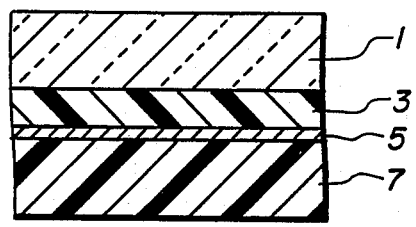
FIG. 3 is a schematic diagram of a single monolayer optical disk.

FIG. 3 is a schematic representation of a single monolayer optical disk which is comprised of five layers. In this type disk, an optically flat clear glass substrate 1 is coated with a barrier layer 3 which will prevent the migration of inorganic ions from substrate 1 into light-absorption layer 5. The light-absorption layer (also called the "active layer") is protected from mechanical damage by overcoat layer 7. In monolayer structures of this type, the active layer thickness typically is 110–130 A.

In a preferred form of this disk configuration using a 65/35 Te/Cu alloy active layer, the layers have the following thicknesses:

| | |
|---|---|
| Glass Substrate | 1.2 mm |
| Barrier Layer | 1–20 microns |
| Light-Absorptive Layer | 120 A |
| Overcoat Layer | 100 microns |

Figure 4:
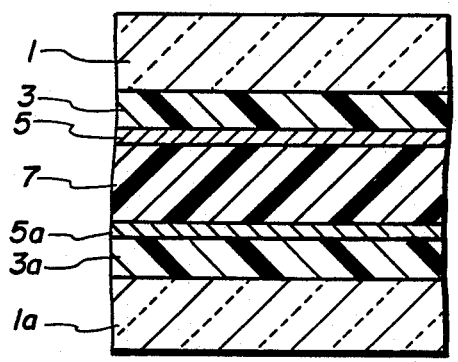
FIG. 4 is a schematic diagram of a dual or "sandwich" monolayer optical disk.

In FIG. 4, there is shown a schematic representation of a dual or "sandwich" monolayer optical disk, which can be written upon and read from both sides of the disk. In this type disk, two clear glass substrates 1 and 1a are coated with barrier layers 3 and 3a on which light-absorptive layers 5 and 5a are deposited. The two laminates are joined by means of a mutual adhesive layer 7 which may be made from the same polymer as the overcoat layer 7 in FIG. 3.

In an another preferred form of this disk configuration using a 69/31 Te/Cu alloy active layer, the layers have the following thicknesses:

| | |
|---|---|
| Glass Substrates | 1.2 mm |
| Barrier Layers | 1–20 microns |
| Light-Absorptive Layers | 120 A |
| Adhesive Layer | 100 microns |

Monolayer disk structures of the kind described above are disclosed in U.S. Pat. No. 4,410,581 to Nam.

Figure 5:
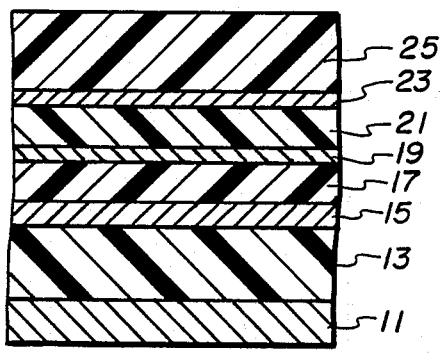
FIG. 5 is a schematic diagram of a trilayer optical disk.

FIG. 5 is a schematic representation of the use of the invention with a trilayer optical configuration. In this disk structure, a machined aluminum substrate 11 is coated with a polymeric planarizing layer 13 to assure further the planarity of the subsequent layers. A thin coating of aluminum metal 15 is then applied to the planarizing layer 13 by sputtering. The aluminum layer 15 serves as a reflective layer for light which passes through the active layer 19, which is a thin layer of an alloy of, for example, 69% Te and 31% Cu, and optical layer 17 which is made from an inert fluorocarbon polymer. The light-absorptive Te/Cu alloy layer 19 has coated upon it a second inert fluorocarbon polymer layer 21 which serves as a moisture and vapor barrier and thus renders the underlying assembly hermetic. A very thin layer of metallic aluminum 23 atop the hermetic layer 21 serves to effect higher adhesion of dust-defocusing layer 25. Trilayer structures of this kind are disclosed inter alia in U.S. Pat. No. 4,270,132 to Bell. Suitable compositions for use as the dust defocusing layer are described by Galloway in pending U.S. patent application Ser. No. 760,947 filed July 31, 1985. Such dust defocusing layers can be applied by the method disclosed by Geary et al. in pending U.S. patent application Ser. No. 909,181 filed Sept. 19, 1986. Suitable compositions for use as planarizing layers are disclosed by Lewin in pending U.S. patent application Ser. No. 016,516 filed Feb. 17, 1987. In the trilayer structure, the light absorptive Te/Cu alloy layer thickness typically is 60–80 A.

In a preferred embodiment of the trilayer disk configuration using the 65/35 Te/Cu alloy for the active layer, the layers have the following preferred thicknesses:

| | |
|---|---|
| Aluminum Substrate | 2 mm |
| Planarizing Layer | 2–5 microns |
| Aluminum Reflective Layer | 1000 A |
| Optical Layer | 800 A |
| Light-Absorptive Layer | 70 A |
| Barrier Layer | 800 A |
| Aluminum Adhesion Layer | 40 A |
| Defocusing Layer | 180 microns |

C. Element Fabrication

In the examples which follow, the following described procedures were used for the fabrication of the optical recording media which were evaluated.

1. Trilayer Disk Configuration

A clean 14.025" O.D. x 6.625" I.D. x 0.075" thick aluminum disk was placed on a spin coater with an automatic disperser arm. A solution was prepared comprising Pyralin® (1) PI 2525 (64.1 pbw), GE Methylon® (2) 75108 (4.81 pbw), N-methyl pyrrolidone (9.29 pbw), cyclohexanone (16.3 pbw), and isobutanol (5.6 pbw). This solution was dispensed onto the aluminum disk through a 0.2 micron filter while the disk was spinning at 40 rpm. The disk was then spun at 400 rpm to throw excess solution off the disk surface, leaving behind a uniform solution layer. The disk was then placed in an oven and heated so that it dried, and thermally reflowed and cross-linked, leaving a smooth 4 micron film which improved the surface smoothness of the aluminum disk.

(1)Pyralin ® is a trademark of E. I. du Pont de Nemours and Company, Wilmington, Del. for polyimide coatings.
(2) Methylon ® is a trademark of the General Electric Co., Schenectady, N.Y. for phenolic crosslinking resins.

The aluminum disk with smoothing layer was placed on a 20"×22" aluminum pallet and inserted into a Leybold-Heraeus Z600 in-line sputtering system. The sputtering system contained three separate chambers for deposition of thin film materials. The pallet was inserted into the first chamber, and the chamber was pumped to a very low pressure ($5 \times 10^{-7}$ torr) and then ballasted with $5 \times 10^{-3}$ torr argon. A 3,000 watt d.c. glow discharge was established in front of a planar magnetron sputtering source in the chamber, said magnetron having a cathode facing (target) of aluminum. The pallet with disk was passed twice in front of the planar magnetron at a speed of 0.5 meter per minute, and an aluminum film 1,000 A thick was deposited uniformly over the surface of the smoothing layer on the disk. The glow discharge was extinguished, and the pallet was moved into the second chamber of the deposition system. In this chamber, a very low pressure was established, and the chamber was then ballasted to a pressure of $8 \times 10^{-2}$ torr with perfluoro-1,3-dimethyl cyclohexane, a flurocarbon monomer. A 35 kHz a.c. glow discharge was established in front of a planar carbon cathodic electrode at a power level of 500 watts. The pallet was then passed eight times in front of the cathode at a speed of 1 meter per minute, whereupon a fluorocarbon dielectric film 800 A thick was deposited uniformly over the surface of the disk. The plasma was extinguished, and the pallet was then inserted into the third chamber of the deposition system, which was pumped to a very low pressure and then ballasted to a pressure of $5 \times 10^{-3}$ torr argon. A 250 watt, 13.56 MHz r.f. glow discharge was then established in front of a planar magnetron sputtering source in the chamber, said sputtering source having a cathode facing (target) of Te/Cu in the atomic ratio 65/35 (Te/Cu). The pallet was passed once in front of the planar magnetron at a speed of 0.6 meter per minute, whereupon a 75 A film of Te/Cu (65/35) was uniformly deposited over the surface of the disk. The plasma was extinguished, and the pallet was then inserted into the second chamber whereupon a fluorocarbon dielectric film 800 A thick was deposited uniformly over the surface of the Te/Cu layer. The pallet was then inserted into the first chamber, where aluminum was again deposited, this time with a power of 500 watts, scan speed of 2 meters per minute, pressure of $5 \times 10^{-3}$ torr, and a single pass. This resulted in a deposited film of 20 A thickness uniformly deposited over the surface of the disk.

The disk was removed from the vacuum system and a 7 mil thick dust defocusing layer was applied by die casting of a wet film of photosensitive monomer which was then u.v. polymerized.

2. Monolayer Disk Configuration

A clean optically flat glass disk of dimensions 14.025" O.D., 6.625" I.D., and 0.075" thickness was placed on a spin coater with an automatic disperser arm. With the disk spinning at 40 rpm, a solution of [HDDA] was dispensed onto the disk. The disk was then spun at 400 rpm to throw excess material off the substrate. The coated liquid film was then u.v. polymerized to form a hard, transparent film with low thermal conductivity compared to glass.

The disk was then inserted into a vacuum system and pumped to a pressure of $2 \times 10^{-7}$ torr. The vacuum chamber was then backfilled to a pressure of $5 \times 10^{-3}$ torr with argon. An 8" diode sputtering source with a 65% Te/35% Cu target was energized with 100 watts of 13.56 MHz r.f. power to form a glow discharge plasma in front of the target. The disk was spun in place in front of the target, with the target facing the annulus of the disk. Sputter deposition commenced and continued for 240 seconds, whereupon the plasma was extinguished. The resulting film was 120 A thick and uniformly deposited on the disk. The disk was removed from the vacuum system.

A 180 micron overcoat layer was applied over the sputtered active layer by die casting a solution of photosensitive monomer followed by u.v. polymerization.

3. Formulation of Alloy Sputtering Target

A blend of Te/Cu (65/35) powder was produced by mixing 200 mesh powders of the two elements in a powder blender for 24 hours. The blend was then sealed in a thin stainless steel envelope with a 1.9 cm mild steel plate base. This assembly was then placed in a pressure vessel, where the pressure was raised to 15,000 psi and the temperature was raised to 400° C. for three hours. The assembly was then removed from the vessel and the envelope was machined from the base plate. The resultant was a solid target of approximately the dimensions of the envelope before removal. The face of the target was machined flat and smooth with an end mill. The target was then knocked loose from the base plate, and the back face and sides of the target were machined to shape.

D. Test Procedures

1. X-Ray Diffraction Measurement of Thin Films

X-ray diffraction patterns were obtained as a function of temperature in a reflection instrument with the sample in vacuum. A scan of the diffracted x-ray spectrum was obtained at a set temperature and then the temperature was incrementally increased by 10° C., whereupon new scans were obtained. Each scan took about one hour, so the total time to obtain temperature dependent diffraction data for one sample took up to about 20 hours. Determination of crystallization temperature is somewhat arbitrary due to the fact that peaks can be observed to different degrees, depending on the sensitivity setting of the detection system. In all cases, however, the same criteria were used for identifying the crystallization temperatures for the various alloys.

2. Dynamic Testing

The disks were clamped to a spindle which was then spun at 22 Hz. Tracks were written with 488 nm wavelength light focussed to 0.6 micron FWHM spot size and read with 633 nm wavelength light focussed to an 0.7 micron FWHM spot size. Tracks were written at a radius of 12.3 cm, resulting in a disk surface linear velocity of 17 meters per second. Written signals consisted of 25 to 60 nsec pulses written at 3 MHz frequency. Readout signals were analyzed with a spectrum analyzer (for SNR measurements) and a time interval counter (for mark length measurements). SNR was measured in a 30 kHz bandwidth.

The advantageous properties of the optical recording element of the invention can be observed by reference to the following examples.

EXAMPLES

EXAMPLE 1

The crystallization temperature of various 1000A thick Te/Cu specimens was obtained by observing x-ray diffraction pattern as temperature was increased. For films made at or within 6% of eutectic (29 atomic % Cu), crystallization took place through two distinct modes. At about 150° C., the onset of crystallization was observed, with crystalline phases of Te and Cu/Te formed. Above 230° C., the Cu/Te phase became highly textured as indicated by a 100-fold increase in the diffracted amplitude from (00 n) planes.

EXAMPLE 2

75 A thick films of various Te/Cu alloy compositions (0% Cu, 20% Cu, 25% Cu, 30% Cu, 35% Cu and 50% Cu by atomic proportion) were deposited on Corning type 7059 low alkali glass substrates. The films were then subjected to room ambient conditions for six weeks followed by accelerated aging at $-60°$ C./95% RH. Optical transmission at a wavelength of 633 nm was monitored as a function of time in the accelerated aging condition. The pure Te film (0% Cu), which is crystalline at room temperature, oxidized very quickly, as did the film with 50% Cu; this was indicated by higher transmission as the test progressed. The 20% Cu film exhibited greater, then lower, transmission as the test progressed, indicating oxidative and morphological instability (crystallization). The 25%, 30% and 35% Cu films exhibited much greater morphological and oxidative stability than the other films. These data are summarized in FIG. 6. This figure serves to show that the claimed range of composition is valid for stable film behavior. Note that the 35% Cu film is the most stable, showing no evidence of morphological instability. This is believed to be due to the oxidative passivation mechanism for these films in which Cu diffuses to the surface and forms a passivating oxide. If the film is deposited with a slight excess of Cu, it is believed it will end up having approximately the eutectic composition after the Cu diffusion takes place resulting in a very stable film. If the film is deposited with the eutectic composition, then after Cu diffusion, it is believed that the bulk of the film will be slightly Cu deficient relative to the actual eutectic composition and thus may be morphologically less stable.

For very thin films (less than 150 A), the mark formation mechanism is coalescence. Coalescence alters the optical properties, resulting in a reduction of light absorption. As the film thickness increases, the mark formation undergoes a transition from coalescence to "ablation" in which a physical hole surrounded by a rim is formed in the film. The physical process governing these two distinct modes of mark formation is minimization of the surface tension of the film. In the thin film case, this results in the formation of small globules of material. The material coalesces in place, thus involving only "local" mass transport. In the thick film case, all the film mass in the mark is transported into the rim and thus involves larger scale mass transport.

The effects of film thickness on marking characteristics are demonstrated using a coalescence type Te/Cu film of 120 A thick and an ablative type Te/Cu film of 500 A thick. As shown in FIG. 7, for the coalescence marking mechanism of a 120 A film, contact overcoats increase the signal-to-noise ratio (SNR), i.e., carrier-to-noise ratio (CNR), with just a small increase in power requirements. In contrast, SNR is decreased for contact overcoats on ablative media (500 A film) and power requirements are substantially increased.

In FIG. 8 where power requirements are graphically correlated with mark length for the coalescent (120 A film) mechanism and ablative (500 A film) mechanism, it is clear that substantially shorter mark lengths are achievable with the coalescence film using equivalently low power laser pulses than for ablative films. Furthermore, the variation of mark length with power change of the pulse at the low write power range is small and approximately linear for the coalescence film as compared to the substantially greater non-linear change of the ablative film type. Such low sensitivity of mark length to power variation is advantageous in obtaining recorded marks of consistant and reproducible mark lengths.

We claim:

1. A non-ablative optical recording element comprising a light-absorptive layer supported upon a dimensionally stable substrate in which the light-absorptive layer is a continuous morphologically stable amorphous layer of an alloy of Te and Cu selected from an alloy having an eutectic melting point and near-eutectic alloys, the compositions of which deviate no more than 6%, atomic basis, from the true eutectic composition.

2. The element of claim in which the light-absorptive layer is sandwiched between two layers of optically transparent solid polymeric material which is impervious to moisture and vapor an is chemically inert with respect to the Te and Cu alloy.

3. The element of claim 1 in which the layer on an atomic basis, consists essentially of atomic 65–71% Te and 356–29% atomic Cu.

4. The element of claim 2 in which at least one of the impervious layers is a flexible film-forming organic solid.

5. The element of claim 4 in which the impervious layers are comprised of the products of plasma polymerization of tetrafluroethylene.

6. The element of claim 2 which has a monolayer optical configuration.

7. The element of claim 6 in which the thickness of the light-absorptive layer is 110–130 A.

8. The element of claim 7 in which the thickness of the light-absorptive layer is 120 A.

9. The element of claim 2 which has a trilayer optical configuration.

10. The element of claim 9 in which the thickness of the light-absorptive layer is 60–80 A.

11. The element of claim 10 in which the thickness of the light-absorptive layer is 70 A.

12. The element of claim 1 in which the light-absorptive layer is encapsulated within a protective coating of an optically transparent solid polymeric material which is impervious to moisture and vapor and is chemically inert with respect to the Te and Cu alloy.

* * * * *